United States Patent
Gloeckle et al.

(10) Patent No.: US 8,318,103 B2
(45) Date of Patent: Nov. 27, 2012

(54) CATALYTIC CONVERTER ASSEMBLY IN AN EXHAUST GAS POSTTREATMENT SYSTEM

(75) Inventors: Markus Gloeckle, Stuttgart (DE); Martin Bohnet, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 968 days.

(21) Appl. No.: 12/084,950

(22) PCT Filed: Nov. 13, 2006

(86) PCT No.: PCT/EP2006/068384
§ 371 (c)(1),
(2), (4) Date: Feb. 4, 2009

(87) PCT Pub. No.: WO2007/054574
PCT Pub. Date: May 18, 2007

(65) Prior Publication Data
US 2009/0199550 A1    Aug. 13, 2009

(30) Foreign Application Priority Data

| Nov. 14, 2005 | (DE) | 10 2005 054 129 |
| Dec. 27, 2005 | (DE) | 10 2005 062 556 |
| Apr. 24, 2006 | (DE) | 10 2006 018 955 |
| May 4, 2006 | (DE) | 10 2006 020 693 |
| May 9, 2006 | (DE) | 10 2006 021 490 |
| May 11, 2006 | (DE) | 10 2006 021 987 |
| May 12, 2006 | (DE) | 10 2006 022 385 |
| May 17, 2006 | (DE) | 10 2006 022 992 |
| May 18, 2006 | (DE) | 10 2006 023 338 |
| Sep. 14, 2006 | (DE) | 10 2006 043 084 |

(51) Int. Cl.
*B01D 53/90* (2006.01)
*B01D 53/94* (2006.01)
*C01C 1/04* (2006.01)

(52) U.S. Cl. .............................. 422/177; 422/148
(58) Field of Classification Search .................. 422/148, 422/168, 169, 171, 172, 177; 60/295, 301
See application file for complete search history.

(56) References Cited

U.S. PATENT DOCUMENTS 7,213,395 B2 *   5/2007   Hu et al. .................. 60/286
(Continued)

FOREIGN PATENT DOCUMENTS

| DE | 10128414 A1 | 12/2002 |
| DE | 10139142 A1 | 2/2003 |

(Continued)

OTHER PUBLICATIONS

Engish Machine Translation of DE 103 13 704 A1, Publication date of 2004, as included in above citation of foreign patent.

*Primary Examiner* — Jill Warden
*Assistant Examiner* — Joye L Woodard
(74) *Attorney, Agent, or Firm* — Michael Best & Friedrich LLP

(57) ABSTRACT

The invention relates to a catalyst arrangement in an exhaust gas after-treatment system of an internal combustion engine comprising an exhaust gas line in which an SCR catalyst is positioned in the direction of flow of the exhaust gas. A reducing agent production system has an NOx and CO/H2 production unit and a combined NOx storage/ammonia production unit in the standard gas-carrying path of the reducing agent production system which supplies ammonia as the reducing agent. The NOx and CO/H2 production unit is at least temporarily supplied via a fuel supply and an air supply with starting products for producing ammonia. The combined NOx storage/ammonia production unit has a plurality catalyst sections having different characteristic properties or functionalities, enabling a higher ammonia yield in the combined NOx storage/ammonia production unit. The catalyst formulations make it possible to adjust a temperature profile that additionally influences the ammonia production rate and contributes to higher ammonia yields.

20 Claims, 2 Drawing Sheets

U.S. PATENT DOCUMENTS

| | | | |
|---|---|---|---|
| 7,254,939 B2 * | 8/2007 | Duvinage et al. | 60/286 |
| 7,485,272 B2 * | 2/2009 | Driscoll et al. | 423/213.2 |
| 2004/0237507 A1 | 12/2004 | Duvinage et al. | |
| 2006/0101809 A1 * | 5/2006 | Bodo et al. | 60/286 |

FOREIGN PATENT DOCUMENTS

| | | |
|---|---|---|
| DE | 10313704 A1 | 10/2004 |
| WO | 0114742 A1 | 3/2001 |
| WO | 2004071646 A2 | 8/2004 |

* cited by examiner

| Catalytic Converter Combination | Proportion of Upstream Type A In Total Volume (%) | Proportion of Downstream Type A in Total Volume (%) | Net Yield of Ammonia (%) | Gross Yield of Ammonia (%) |
|---|---|---|---|---|
| B | 0 | 0 | ~67 | ~72 |
| BBA | 0 | 33 | ~78 | ~80 |
| BBBA | 0 | 16 | ~72 | ~74 |
| ABBA | 16 | 16 | ~67 | ~68 |
| A | 100 | 100 | ~39 | ~40 |

CATALYTIC CONVERTER ASSEMBLY IN AN EXHAUST GAS POSTTREATMENT SYSTEM

CROSS-REFERENCE TO RELATED APPLICATION

This application is a 35 USC 371 application of PCT/EP 2006/068384 filed on Nov. 13, 2006.

BACKGROUND OF THE INVENTION

1. Field of the Invention

The invention relates to a catalytic converter assembly in an exhaust gas posttreatment system of an internal combustion engine, having an exhaust gas duct in which an SCR catalytic converter is provided in the flow direction of the exhaust gas, and a reductant generating system (RGS) has both an $NO_x$ and $CO/H_2$ generating unit and a combined $NO_x$ reservoir/ammonia generating unit (AGC) in the standard gas course of the reductant generating system, and for reducing nitrogen oxides, ammonia can be supplied as reductant by the reductant generating system upstream of the SCR catalytic converter, and the $NO_x$, and $CO/H_2$ generating unit can be at least intermittently supplied via a fuel supply and an air supply with starting materials for generating the ammonia.

2. Description of the Prior Art

For reducing nitrogen oxides in the exhaust gas of engines operated with a lean fuel mixture, $NO_x$ storage catalytic converters, also called $NO_x$ storage/reduction catalytic converters or NSCs, can be used. These $NO_x$ storage catalytic converters function discontinuously in a mode that comprises two phases: In the first, longer phase or so-called lean phase (Lambda>1), the nitrogen oxides from the engine that are contained in the exhaust gas are stored. In the second, shorter phase, the so-called rich phase (Lambda<1), the stored nitrogen oxides are regenerated by means of rich exhaust gas generated inside the engine. In the regeneration, in the conventional mode of operation of an NSC, only nitrogen ($N_2$), water ($H_2O$), and carbon dioxide ($CO_2$) are produced from the stored nitrogen oxides.

It is fundamentally known that under unfavorable regeneration conditions, such as a very long regeneration and/or low Lambda value ($\lambda \approx 0.8$), a more likely small proportion of the stored $NO_x$ can be converted to ammonia ($NH_3$). In that case, however, the $NH_3$ formation is an unwanted, parasitic effect.

In connection with future specifications in terms of nitrogen oxide emissions from motor vehicles, suitable exhaust gas posttreatment is necessary. Selective catalytic reduction (SCR) can be used to reduce $NO_x$ emissions (removal of nitric oxides) in internal combustion engines, especially diesel engines, with intermittently predominantly lean or in other words oxygen-rich exhaust gas. In this process, a defined quantity of a selective-action reductant is added to the exhaust gas. The reductant may for instance be in the form of ammonia, which is metered in directly in gaseous form, or is also obtained from a precursor substance in the form of urea or from a urea-water solution (UWS). Such UWS-SCR systems were used first in utility vehicles.

In German Patent Disclosure DE 10139142 A1, an exhaust gas cleaning system in an internal combustion engine is described, in which to reduce $NO_x$ emissions, an SCR catalytic converter is used, which reduces the nitrogen oxides that are in the exhaust gas to nitrogen using ammonia as the reagent. The ammonia is obtained from the urea-water solution (UWS) in a hydrolytic catalytic converter located upstream of the SCR catalytic converter. The hydrolytic catalytic converter converts the urea, contained in the UWS, into ammonia and carbon dioxide. In a second step, the ammonia reduces the nitrogen oxides to nitrogen, creating water as a byproduct. The precise sequence has been extensively described in the professional literature (see Weissweller in CIT (72), pages 441-449, 2000). The UWS is furnished in a reagent tank.

It is disadvantageous in this method that UWS is consumed in the operation of the internal combustion engine. Its consumption is approximately 4% of the fuel consumption. The supply of urea-water solution would have to be assured over a suitably large area, for instance at service stations. Another disadvantage of the method is the necessary operating temperature range. The hydrolytic reaction of the urea-water solution does not occur quantitatively at the hydrolytic catalytic converter, releasing ammonia, until temperatures of more than 200° C. In diesel engines, for instance, these exhaust gas temperatures are not reached until after a relatively long period of operation. At temperatures below 200° C., deposits can cause clogging of the metering unit, which at the very least is a hindrance to delivering the urea-water solution to the exhaust gas system. Adding the urea-water solution at temperatures below 200° C. can also, because of polymerization, inhibit the necessary catalytic properties of the hydrolytic catalytic converter of the SCR catalytic converter.

German Patent DE 199 22 961 C2 describes an exhaust gas cleaning system for cleaning the exhaust gas of a combustion source, in particular a motor vehicle internal combustion engine, of at least the nitrogen oxides contained in it, using an ammonia generating catalytic converter for generating ammonia, using ingredients of at least some of the exhaust gas emitted by the combustion source during ammonia-generating phases of operation, and also using a nitrogen oxide reducing catalytic converter downstream of the ammonia generating catalytic converter, for reducing nitrogen oxides contained in the emitted exhaust gas from the combustion source, using the generated ammonia as a reductant. In this system, a nitrogen oxide generating unit that is external to the combustion source is provided for enriching the exhaust gas, supplied to the ammonia generating catalytic converter, with nitrogen oxide generated by it during the ammonia generating phases of operation. A plasma generator is proposed for instance as the nitrogen oxide generating unit, for plasma technology oxidation of nitrogen, contained in a delivered gas stream, to nitrogen oxide. The hydrogen required for generating the ammonia is generated during the ammonia generated phases of operation by operating the combustion source with a rich or in other words fuel-rich air ratio.

A disadvantage of this method is the relatively high fuel consumption during the requisite rich phases of operation. Furnishing the nitrogen oxide to the engine externally also dictates high energy usage, especially since nitrogen oxide has to be produced in high concentration during the ammonia generating phases, which have to be as short as possible, and the remaining residual oxygen for generating ammonia has to be removed in a way that is expensive in terms of energy. If the hydrogen is generated via a $PO_x$ catalytic converter by means of partial oxidation reforming ($PO_x$), then a further disadvantage the heretofore poor dynamics of generating hydrogen results. to be removed in a way that is expensive in terms of energy. If the hydrogen is generated via a $PO_x$ catalytic converter by means of partial oxidation reforming ($PO_x$), then a further disadvantage the heretofore poor dynamics of generating hydrogen results.

A method for generating a hydrogen-rich gas mixture using plasma chemistry is described in International Patent Disclosure WO 01/14702 A1. In it, a rich fuel-air mixture is treated in an electric arc, preferably under $PO_x$ conditions.

To avoid having to carry an additional fuel as well, a plasma method for on-board generation of reductants has been proposed in an as yet unpublished document of the present Applicant. In it, the ammonia required for reducing the nitrogen oxides is produced from nontoxic substances as needed in the vehicle and then is delivered to the SCR process. An acceptable solution in terms of fuel consumption is offered by a discontinuous method for ammonia generation, of the kind also proposed in the same document. This method will hereinafter be called the RGS method (Reductant Generating System), or reducing agent generating system.

One important component of an RGS unit is a catalytic converter, which while it does operate on the discontinuous fundamental principle of an $NO_x$ storage catalytic converter (NSC), is nevertheless operated such that the nitrogen oxides, stored in the lean phase, are converted in a targeted way in the rich reduction phases into ammonia, rather than into nitrogen oxide. The nitrogen oxides are produced under lean conditions, for instance from air, in a nitrogen oxide generating unit that is combined with a hydrogen/carbon monoxide generating unit to make an $NO_x$ and $CO/H_2$ generating unit. This $CO/H_2$ generating unit is also called a reductant generating unit. The gas mixture leaving this unit in the rich phases predominantly comprises $H_2$, CO, and $N_2$, and is also called reformate gas. The ammonia generated periodically (that is, cyclically) in this way is metered to the exhaust gas train of the engine and is converted with $NO_x$ from the engine to $N_2$ in the downstream SCR catalytic converter. This kind of $NO_x$ storage catalytic converter operated with maximum $NH_3$ and based on an $NO_x$ storage catalytic converter is also called an AGC unit (AGC stands for "ammonia generating catalyst").

The operating conditions of the AGC unit for targeted generation of ammonia outside the exhaust gas train are extremely different from those of a conventional NSC in the full exhaust gas stream. Essentially, the differences are these:

an approximately 10 to 20 times higher concentration of $NO_x$ (up to 1%) and of $H_2$/CO (totaling up to 40%);

typically markedly higher global $NO_x$ load densities of the $NO_x$ storage catalytic converter (up to 2 g $NO_2$ per liter of AGC volume), and associated with this, extremely exothermic heat tonalities over the length of the catalytic converter in the AGC unit, with positive temperature gradients $\Delta T$ of over 100° C.

The ammonia yield in the AGC unit depends on the temperature management at the AGC unit, or the temperature profile over the length of the AGC unit; on the duration of the rich phase; on the concentration of reductant agent; and on the catalytic converter formulation.

It is therefore the object of the invention to furnish a catalytic converter assembly of the AGC in which a high ammonia yield can be attained.

SUMMARY OF THE INVENTION

The object of the invention is attained in that the combined $NO_x$ reservoir/ammonia generating unit (AGC unit) has one or more catalytic converter sections, which have different characteristic properties and functionalities in the flowthrough direction. In particular compared to catalytic converter assemblies each with a single catalytic converter formulation, with the arrangement according to the invention the ammonia yield can be increased markedly. In addition, with the catalytic converter formulation, a characteristic temperature profile in the flowthrough direction along a run-distance can be generated, and the ammonia formation rate can be varied in a targeted way along the run-distance.

In a preferred embodiment, the catalytic converter assembly is formed by a series connection of different catalytic converter types, spatially separated in the flowthrough direction. The targeted spatial separation of the functionalities and properties of the catalytic converter formulations, with varying characteristics in the flowthrough direction of a primary $NO_x$ storing function during the lean phase and a slow "$NO_x$ withdrawal" in the rich phase in the upstream region of the AGC unit from a primarily fast reduction of the "withdrawn" NO to $NH_3$ in the rich phase in the downstream region, according to the invention, promotes the ammonia forming capability and hence the ammonia yield of the AGC unit; the term "$NO_x$ withdrawal" means the reductive decomposition of barium nitrate, for instance, to NO. In addition, in a comparable way, different catalytic converter assemblies can thus be attained which can be adapted in their properties to the requirements of the ammonia formation.

One variant embodiment provides a catalytic converter assembly, which is formed by a series connection of different catalytic converter types, and the catalytic converter formulation on a catalytic converter holder varies in the flowthrough direction in accordance with the catalytic converter types. This is advantageous with respect to the production process, since the different catalytic converter types, with their different catalytic converter formulations, can be produced during the production process by varying the chemical composition in the operation of coating the substrate structure.

A preferred variant embodiment provides that on the catalytic converter holder, the catalytic converter formulation varies continuously in the flowthrough direction, so that an ideal temperature profile for a high ammonia yield, for instance, can be established in a targeted way via the run-distance of the catalytic converter.

A gradient in the characteristic properties of the catalytic converter, or the "sequential" interconnection of catalytic converter formulations and their associated characteristic properties, can be attained especially advantageously if the catalytic converter holder has a gradient coating in the flowthrough direction.

Depending on the structural form of the catalytic converter in the AGC unit, the various catalytic converter types in the AGC unit are disposed linearly or radially, and the gas flow in the flowthrough direction of the catalytic converter assembly is carried in the radial arrangement from a region of the AGC unit near the axis to an outer jacket region of the AGC unit.

If for an $NO_x$ storage/reduction catalytic converter, a type A catalytic converter has high activity, with respect to its reduction and/or oxidation properties, compared to a type B catalytic converter, the result on the one hand is often a comparatively low tendency to $CO_2$ poisoning for the type A catalytic converter in the comparison to the type B catalytic converter. In combination with or as a consequence of these properties, a comparatively high $NO_x$ storing activity or high $NO_x$ transferral activity or "$NO_x$ withdrawal activity" can be recorded for a type A catalytic converter at temperatures up to about 250° C. The consequence is a very early or in other words very fast liberation of energy and hence a fast and steeply rising temperature profile over the run-length of the catalytic converter. Conversely in the type B catalytic converter, a comparatively slow and uniform release of energy and associated with it a rather shallow and nearly linearly rising temperature profile is generated over the run-length.

If the type B catalytic converter is located upstream of the type A catalytic converter in the flowthrough direction, then the ammonia yield can be increased. If in an especially preferred embodiment the type B catalytic converter in the flowthrough direction corresponds to approximately ⅔ of a run-distance component, or a matrix flow volume, and the type A catalytic converter corresponds to approximately ⅓ of the run-distance component or of the matrix flow volume, the ammonia yield can be increased up to approximately 80% under the conditions of RGS operation, as measurements have shown.

A variant embodiment for the catalytic converter assembly provides that the catalytic converter assembly, in the flowthrough direction, first has a type A catalytic converter, then a type B catalytic converter, and at the end another type A catalytic converter. With this as well, ammonia yields are already attained that are above those that can be attained using purely the type A catalytic converter. With the type A catalytic converter at the beginning, it is moreover possible, because of its comparatively high reactivity, to attain a steeper temperature profile already in the inlet region of the combined $NO_x$ reservoir/ammonia generating unit.

If in the downstream part of the catalytic converter assembly in terms of the flowthrough direction, a catalytic converter formulation is used which has a high NO reduction activity, an NO reduction reaction in the downstream portion of the catalytic converter is promoted in a targeted way, and thus the "withdrawn" NO in the rich phase can be reduced to ammonia quickly and with a high yield, which significantly increases the ammonia yield from the combined $NO_x$ reservoir/ammonia generating unit.

If in the downstream part of the catalytic converter assembly in terms of the flowthrough direction, a catalytic converter formulation is used which has an oxygen-storing and/or CO-adsorbing component, by so-called parasitic loss reactions that take place under exothermic heat tonality, the temperature profile can be adapted in a targeted way with respect to an optimal ammonia formation rate. In a preferred embodiment, with a view to the oxygen-storing component, a catalytic converter formulation is used in the downstream part of the catalytic converter assembly in terms of the flowthrough direction that contains current oxygen-storing compounds, such as $Fe_2O_3$, $CeO_2$, or Ce/Zr mixed oxides. Thus an especially redox-active catalytic converter assembly can be furnished.

If the catalytic converter assembly is used in diesel engines or lean engines that have a reductant generating system with a combined $NO_x$ reservoir/ammonia generating unit (on-board ammonia generator), the nitrogen oxide load can thus be reduced markedly, which is significant particularly in diesel engines. However, in lean engines as well that are operated with regular or super fuel, the catalytic converter assembly in the combined $NO_x$ reservoir/ammonia generating unit, in conjunction with the reductant generating system, can offer advantages in terms of minimizing pollutants.

BRIEF DESCRIPTION OF THE DRAWINGS

The invention will be described in further detail below in terms of the exemplary embodiments shown in the drawings, in which.

DESCRIPTION OF THE PREFERRED EMBODIMENTS

Figure 1:
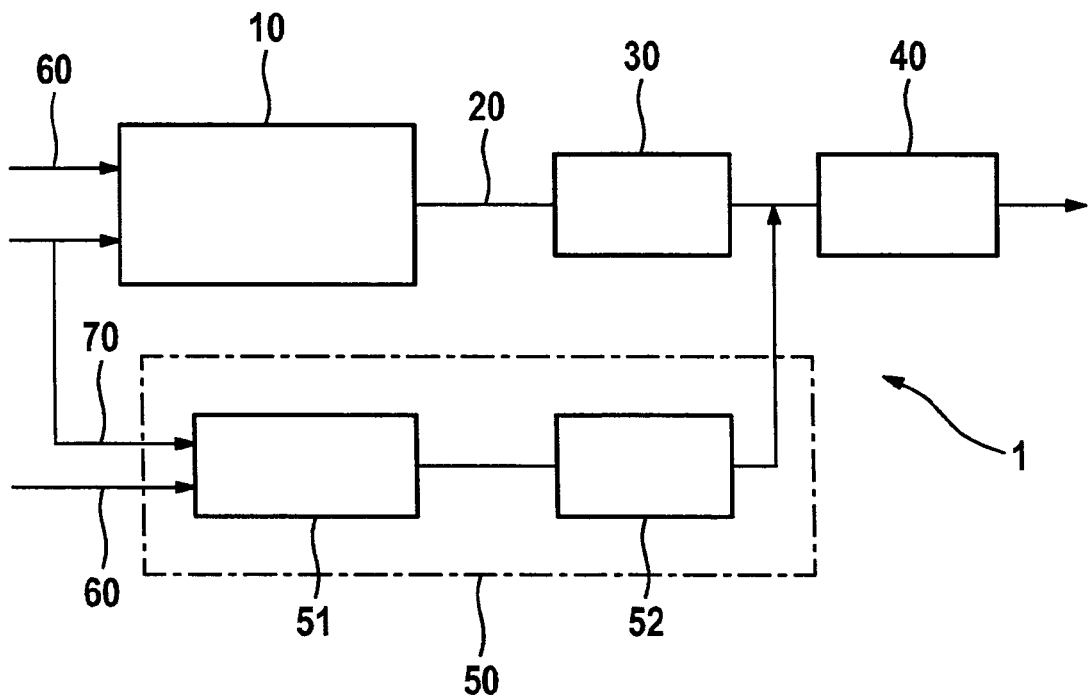
FIG. 1 is a schematic view of an exhaust gas posttreatment system of an internal combustion engine, with a reductant generating system.

FIG. 1 schematically illustrates the technical field, taking a diesel engine as an example, in which the catalytic converter assembly of the invention can be employed.

An exhaust gas posttreatment system 1 is shown for an internal combustion engine 10, whose exhaust gases are carried via an exhaust gas duct 20; a diesel particle filter 30 (DPF) and a downstream SCR catalytic converter 40, in that order in the flow direction of the exhaust gas, are provided. To reduce nitrogen oxides, ammonia can be delivered as a reductant upstream of the SCR catalytic converter 40 by a reductant generating system 50 (RGS). SCR catalytic converters 40 operate on the principle of selective catalytic reduction, in which by means of ammonia as the reductant, nitrogen oxides in oxygen-bearing exhaust gases are reduced to nitrogen and water.

The reductant generating system 50, in the flow direction, has an $NO_x$ and $CO/H_2$ generating unit 51 and a combined $NO_x$ reservoir/ammonia generating unit 52. Starting materials for generating the ammonia can be supplied at least intermittently to the $NO_x$ and $CO/H_2$ generating unit 51 via an air supply 70 and a fuel supply 60. The ammonia is generated from air, exhaust gas, or a mixture of air and exhaust gas, as well as in the example shown from diesel fuel. To that end, a hydrogen generating unit and a nitrogen oxide generating unit are provided. In the example shown, the $NO_x$ generating unit is embodied as a plasma reactor, in which $NO_x$ is generated from air by means of a glow discharge-like process. In this example as well, the plasma reactor contains the oxidation catalytic converter (cPOx) located downstream of the $NO_x$ generating unit.

The generation of ammonia is effected inside the reductant generating system 50, in which nitrogen oxides $NO_x$ in a lean phase ($\lambda > 1$) are generated from air in a plasma process inside the plasma reactor. These nitrogen oxides flow through the adjoining oxidation catalytic converter (cPOx) and then are delivered, in the example shown, to a combined $NO_x$ reservoir/ammonia generating unit 52 and stored. In a second phase of operation, the rich phase ($0.33 < \lambda < 1$) following the second phase of operation, liquid fuel is metered into the air in the region of the plasma reactor in an evaporation and mixture formation zone and converted at the oxidation catalytic converter (cPOx) into a gas mixture that contains hydrogen and carbon monoxide, and this mixture then, in the region of the combined $NO_x$ reservoir/ammonia generating unit 52, converts the previously-stored nitrogen oxides into ammonia.

This gaseous ammonia generated is then metered into the exhaust gas stream in the exhaust gas duct 20 upstream of the SCR catalytic converter 40. Since the SCR catalytic converter 40 has an ammonia storage capability, it is possible even by way of a discontinuous method for generating ammonia to achieve the continuous reduction of the nitrogen oxides in the exhaust gas stream by means of the SCR process. In it, in the temperature range between 150° C. and 450° C., catalytic converters comprising titanium dioxide ($TiO_2$) and vanadium pentaoxide ($V_2O_5$), for instance, convert the nitrogen oxides with the generated ammonia at a high rate.

Figure 2A:
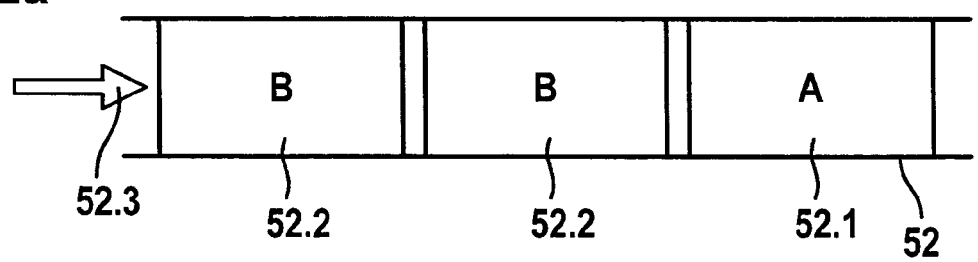
FIGS. 2a through 2c are examples of interconnection combinations of various catalytic converter types.
Figure 2B:
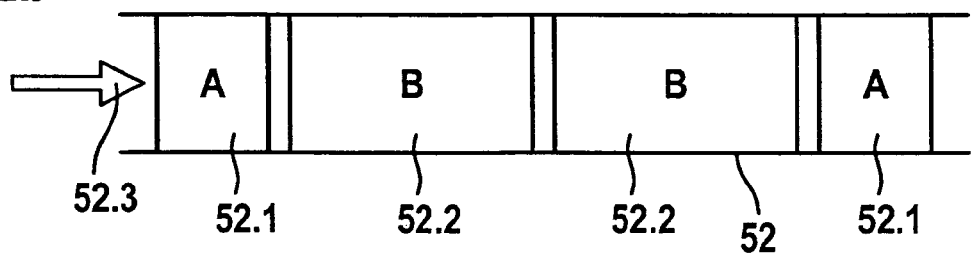
Figure 2C:
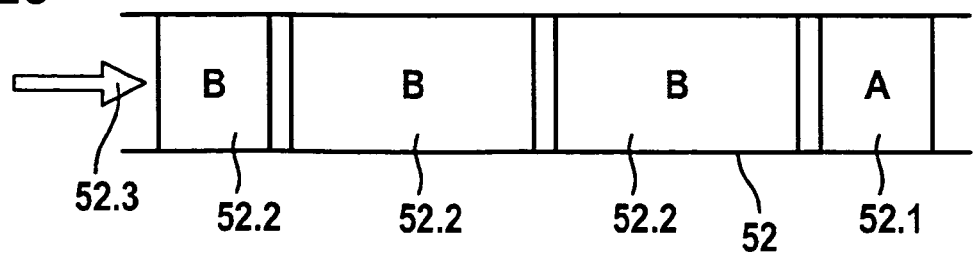

The essential catalytic converter properties of the catalytic converter formulations used in the combined $NO_x$ reservoir/ ammonia generating unit 52 for generating ammonia will be described below in further detail; as FIGS. 2a through 2c show, according to the invention at least two different catalytic converter types 52.1, 52.2 are provided, which differ as follows:

The type A catalytic converter 52.1 has a high activity, compared to the type B catalytic converter 52.2, with regard to $NO_x$ reduction and/or $NO_x$ oxidation properties, and the type A catalytic converter 52.1 exhibits a comparatively low tendency to CO poisoning. In combination with these properties or as a consequence of them, the result at temperatures up to approximately 250° C. is a comparatively high $NO_x$ storing activity and high $NO_x$ transferral activity. The result is moreover very early or in other words very fast energy release and thus a fast, steeply rising temperature profile over a run-distance of the catalytic converter.

By comparison, the type B catalytic converter 52.2 has instead a lesser $NO_x$ storing activity and lesser $NO_x$ transferral activity at temperatures up to 250° C. The consequence is a comparatively slow, uniform release of energy over the run-distance by the catalytic converter and along with this a shallow and approximately linearly rising temperature profile. Moreover, the type B catalytic converter 52.2 may have a higher susceptibility to CO poisoning than the type A catalytic converter 52.1.

FIGS. 2a, 2b and 2c show examples of interconnection combinations of two different catalytic converter formulations, that is, type A catalytic converter 52.1 and type B catalytic converter 52.2, in a flowthrough direction 52.3 inside the combined $NO_x$ reservoir/ammonia generating unit 52.

FIG. 2a shows an arrangement in which the type B catalytic converter 52.2 is disposed upstream of the type A catalytic converter 52.1 in terms of the flowthrough direction 52.3; the type B catalytic converter 52.2 corresponds in the flowthrough direction 52.3 to approximately ⅔ of a run-distance component or a matrix flow volume, and the type A catalytic converter 52.1 corresponds to approximately ⅓ of the run-distance component or of the matrix flow volume.

FIG. 2b shows a variant of the catalytic converter assembly inside the combined $NO_x$ reservoir/ammonia generating unit 52, in which in the flowthrough direction 52.3, first a type A catalytic converter 52.1, then a type B catalytic converter 52.2, and at the end another type A catalytic converter 52.1 are disposed.

FIG. 2c shows a variant of the embodiment of FIG. 2a, in which the type A catalytic converter 52.1 at the end is shortened in favor of the type B catalytic converter 52.2.

Figures 3, 4:
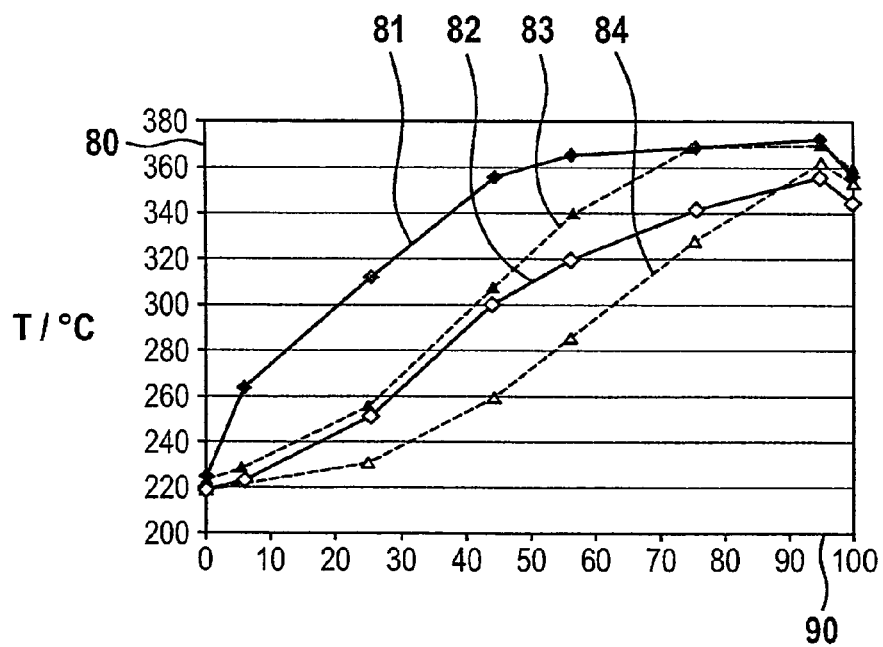
FIG. 3 is a table showing the ammonia yields with different interconnection combinations of different catalytic converter types.
FIG. 4 is an example showing temperature profiles with different catalytic converter types.

FIG. 3 shows a table summarizing the ammonia yields in the interconnection combinations shown in FIGS. 2a, 2b and 2c of the type A catalytic converter 52.1 and the type B catalytic converter 52.2 under the conditions of the RGS. In comparison, the ammonia yields are shown of catalytic converter assemblies which have solely catalytic converter formulations in accordance with type A catalytic converter 52.1 or type B catalytic converter 52.2. Except for the "A only" variant, in which the matrix volume was less by ⅓ than the other arrangements, the total volume of the catalytic converter matrix should be considered to be constant.

As the table shows, very high ammonia yields can be attained in particular with the "BBA" (see FIG. 2a) and "BBBA" (see FIG. 2c) arrangements; particularly with the "BBA" variant, in which the type A catalytic converter 52.1 occupies approximately 33% of the total volume in the downstream portion, in the flowthrough direction 52.3, of the catalytic converter assembly, gross ammonia yields of 80% can be attained. Taking a possible $NO_x$ slip into account, the net ammonia yield is still 78%. By comparison, the "A only" and "B only" variants have net ammonia yields in the range of only approximately 39% and 67%, respectively.

In comparison to using only the type B catalytic converter 52.2, as the results in the table (FIG. 3) show, substituting a type A catalytic converter 52.1 for the type B catalytic converter 52.2 leads to a reduction in the ammonia yield in the inlet region of the combined $NO_x$ reservoir/ammonia generating unit 52, and to an increase in the ammonia yield in the outlet region.

The targeted spatial separation of the functionalities and properties of the catalytic converter formulations, with varying degrees in the flowthrough direction 52.3, from a primary $NO_x$ storing function during the lean phase and a slow "$NO_x$ withdrawal" in the rich phase in the upstream region of the combined $NO_x$ reservoir/ammonia generating unit 52 to a primarily fast reduction of the "withdrawn" NO to $NH_3$ in the rich phase in the downstream region promotes the ammonia formation capability according to the invention and thus promotes the ammonia yield of the combined $NO_x$ reservoir/ammonia generating unit 52. The term "$NO_x$ withdrawal" is to be understood as the reductive decomposition, for instance of barium nitrate to NO, in accordance with the equation

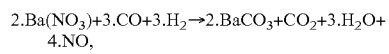

which dominates over the following NO reduction reaction expressed by the equation

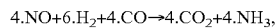

and this NO reduction reaction is promoted in a targeted way in the downstream part of the catalytic converter. "Carryover" density in the flow direction is also advantageous if at the same time a catalytic converter formulation with very high $NO_x$ reduction activity is present in the downstream part. Conversely, this means that $NO_x$ storage catalytic converters that in the running direction have a uniform catalytic converter formulation and high reduction activity, that the primary $NO_x$ storage region is in the upstream region, and the "$NO_x$ withdrawal" ($BA(NO_3)_2 \rightarrow NO$) and the ammonia formation ($NO \rightarrow NH_3$) proceed in principle simultaneously and thus with local strong heat tonality. This cooperation, however, reduces the $NH_3$ selectivity in favor of greater $N_2$ selectivity.

In terms of heat management or temperature management inside the combined $NO_x$ reservoir/ammonia generating unit 52, in certain operating states, such as partial load, of the reductant generating system 50 it is necessary, despite the intrinsic strong exothermia of the ammonia formation, to import additional energy into the combined $NO_x$ reservoir/ammonia generating unit 52, in order in particular to compensate for heat losses. By means of the partial-load operation, for instance with stoppage times of the reductant generating system 50, the cooling and the (axial) heat conduction lead to a redistribution of heat inside the combined $NO_x$ reservoir/ammonia generating unit 52. Thus a temperature profile inside the combined $NO_x$ reservoir/ammonia generating unit 52 along the catalytic converter can be established which reduces the ammonia yield. In the current state of knowledge, this is the case whenever a more "isothermic" temperature profile prevails inside the combined $NO_x$ reservoir/ammonia generating unit 52.

The temperature profile can be varied, by varying the catalytic converter functionality back in the direction of the desired temperature gradient, in such a way that oxygen-storing components ("parasitic components") for instance in the downstream part of the combined $NO_x$ reservoir/ammonia generating unit 52 are present to an increased extent. The redox-active compound cerium oxide has proved to be especially effective.

In a similar way, CO-storing components can become effective. If such CO adsorber components are enriched in a targeted way in the downstream part of the combined $NO_x$ reservoir/ammonia generating unit 52, then once again the course of heat liberation along the run-distance inside the combined $NO_x$ reservoir/ammonia generating unit 52 can be adjusted in a targeted way. Because of the CO adsorption and/or oxygen storage capacity that is varied in a targeted way via the combined $NO_x$ reservoir/ammonia generating unit 52, these so-called parasitic loss reactions, which proceed with exothermal heat tonality, can be used to adapt the temperature profile.

Some of the parasitic exothermic reactions are summarized below:

CO adsorption during the rich phase, burnoff in the lean phase:

$CO + \frac{1}{2}O_2 \rightarrow CO_2 \; \Delta H_R = -283 \text{ kJ/mol } CO_{ads}$ $O_2$ adsorption during the lean phase, reduction in the rich phase:

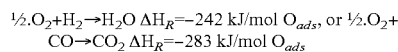

$\frac{1}{2}O_2 + H_2 \rightarrow H_2O \; \Delta H_R = -242 \text{ kJ/mol } O_{ads}$, or $\frac{1}{2}O_2 + CO \rightarrow CO_2 \; \Delta H_R = -283 \text{ kJ/mol } O_{ads}$ Oxygen storage components (OSC), such as cerium oxide:
In the lean phase: $Ce_2O_3 + \frac{1}{2}O_2 \rightarrow 2.CeO_2 \; \Delta H_R = -381.2$ kJ/mol $Ce_2O_3$ In the rich phase: $2.CeO_2 + CO \rightarrow Ce_2O_3 + CO_2 \; \Delta H_R = +98.2$ kJ/mol $Ce_2O_3$ Total: $CO + \frac{1}{2}O_2 \rightarrow CO_2$ per $Ce_2O_3 \; \Delta H_R = -283$ kJ/mol $Ce_2O_3$ In FIG. 4, an example of temperature profiles for various catalytic converter formulations is shown of the kind that occur in cyclical operation of the combined $NO_x$ reservoir/ammonia generating unit 52. A temperature (T) 80 is plotted over a run-distance component (L) 90 for each catalytic converter type.

The curve $T_{max}$ for type A 81 and the curve $T_{max}$ for type B 83 describe the absolute temperature maximums that occur at the site of the respective catalytic converter (the run-distance is along the flowthrough direction 52.3). The curve $T_{min}$ for type A 82 and the curve $T_{min}$ for type B 84 describe the absolute temperature minimums that occur at the site of the respective catalytic converter type. This shows that for type A catalytic converter 52.1, over the run-distance component (L) 90, a steeper temperature profile is established, which is due in particular to the greater activity compared to the type B catalytic converter 52.2. The temperature profile for the type B catalytic converter, conversely, has a markedly shallower course.

All in all, with the variants shown for the catalytic converter assembly inside the combined $NO_x$ reservoir/ammonia generating unit 52, a high ammonia yield can be attained. By means of a spatially different functionality of the catalytic converter formulations in the flowthrough direction 52.3, a temperature profile can furthermore be purposefully established which additionally reinforces a high ammonia yield.

Such catalytic converter assemblies can be used fundamentally in all motor vehicles that have diesel or lean engines that are operated with different fuels and in which a reductant generating system 50 is used as an on-board ammonia generator.

The foregoing relates to the preferred exemplary embodiment of the invention, it being understood that other variants and embodiments thereof are possible within the spirit and scope of the invention, the latter being defined by the appended claims.

The invention claimed is:

1. A catalytic converter assembly for use in an exhaust gas post treatment system of an internal combustion engine, having an exhaust gas duct in which an SCR catalytic converter is fluidically disposed in the flow direction of the exhaust gas, a reductant generating system (RGS) including an $NO_x$ and $CO/H_2$ generating unit having an air supply inlet and a fuel supply inlet and an outlet connected to an inlet of an $NO_x$ reservoir/ammonia generating unit having an outlet connected to said exhaust gas duct upstream of said SCR catalytic converter for supplying ammonia as reductant to the SCR catalytic converter, and wherein said $NO_x$ and $CO/H_2$ generating unit is adapted to be at least intermittently supplied via a fuel supply to said fuel supply inlet and an air supply to said air supply inlet with starting materials for generating the ammonia, the improvement comprising said combined $NO_x$ reservoir/ammonia generating unit comprises a catalytic converter assembly with at least one type A and one type B catalytic converter section having different characteristic properties and functionalities in the flowthrough direction, the at least one type A catalytic converter having high activity with respect to its reduction and/or oxidation properties, compared to the at least one type B catalytic converter, the catalytic converter assembly, in the flowthrough direction, first having a type A catalytic converter, then a type B catalytic converter, and at the end another type A catalytic converter; and said catalytic converter assembly having a catalytic converter formulation comprising at least one oxygen-storing and/or CO-adsorbing compound disposed in a downstream section thereof.

2. The catalytic converter assembly as defined by claim 1, wherein the catalytic converter assembly is formed by a series connection of different catalytic converter types, spatially separated in the flowthrough direction.

3. The catalytic converter assembly as defined by claim 1, wherein the catalytic converter assembly is foil red by a series connection of different catalytic converter types, and the catalytic converter formulation on a catalytic converter holder varies in the flowthrough direction in accordance with the catalytic converter types.

4. The catalytic converter assembly as defined by claim 3, wherein the catalytic converter holder, the catalytic converter formulation varies continuously in the flowthrough direction.

5. The catalytic converter assembly as defined by claim 4, wherein the catalytic converter holder has a gradient coating in the flowthrough direction.

6. The catalytic converter assembly as defined by claim 1, wherein the different catalytic converter types are disposed linearly in the combined $NO_x$ reservoir/ammonia generating unit.

7. The catalytic converter assembly as defined by claim 2, wherein the different catalytic converter types are disposed linearly in the combined $NO_x$ reservoir/ammonia generating unit.

8. The catalytic converter assembly as defined by claim 3, wherein the different catalytic converter types are disposed linearly in the combined $NO_x$ reservoir/ammonia generating unit.

9. The catalytic converter assembly as defined by claim 4, wherein the different catalytic converter types are disposed linearly in the combined $NO_x$ reservoir/ammonia generating unit.

10. The catalytic converter assembly as defined by claim 5, wherein the different catalytic converter types are disposed linearly in the combined $NO_x$ reservoir/ammonia generating unit.

11. The catalytic converter assembly as defined by claim 1, wherein the at least one type B catalytic converter in the flowthrough direction corresponds to approximately ⅔ of a run-distance component, or a matrix flow volume, and the type A catalytic converters correspond to approximately ⅓ of the run-distance component or of the matrix flow volume.

12. The catalytic converter assembly as defined by claim 2, wherein the at least one type B catalytic converter in the flowthrough direction corresponds to approximately ⅔ of a run-distance component, or a matrix flow volume, and the type A catalytic converters correspond to approximately ⅓ of the run-distance component or of the matrix flow volume.

13. The catalytic converter assembly as defined by claim 3, wherein the at least one type B catalytic converter in the flowthrough direction corresponds to approximately ⅔ of a run-distance component, or a matrix flow volume, and the type A catalytic converters correspond to approximately ⅓ of the run-distance component or of the matrix flow volume.

14. The catalytic converter assembly as defined by claim 4, wherein the at least one type B catalytic converter in the flowthrough direction corresponds to approximately ⅔ of a run-distance component, or a matrix flow volume, and the type A catalytic converters correspond to approximately ⅓ of the run-distance component or of the matrix flow volume.

15. The catalytic converter assembly as defined by claim 5, wherein the at least one type B catalytic converter in the flowthrough direction corresponds to approximately ⅔ of a run-distance component, or a matrix flow volume, and the type A catalytic converters correspond to approximately ⅓ of the run-distance component or of the matrix flow volume.

16. The catalytic converter assembly as defined by claim 1, wherein said catalytic converter assembly having a catalytic converter formulation which has a high NO reduction activity disposed in a downstream section thereof.

17. The catalytic converter assembly as defined by claim 2, wherein said catalytic converter assembly having a catalytic converter formulation which has a high NO reduction activity disposed in a downstream section thereof.

18. The catalytic converter assembly as defined by claim 3, wherein said catalytic converter assembly having a catalytic converter formulation which has a high NO reduction activity disposed in a downstream section thereof.

19. The catalytic converter assembly as defined by claim 4, wherein said catalytic converter assembly having a catalytic converter formulation which has a high NO reduction activity disposed in a downstream section thereof.

20. A method of treating exhaust gas of a diesel or lean engine having an SCR catalytic converter in an exhaust duct thereof comprising connecting a catalytic converter assembly as defined by claim 1 to said exhaust duct upstream of said SCR catalytic converter to act as a $NO_x$ reservoir/ammonia generating unit for supplying ammonia to said SCR catalytic converter, thereby enhancing the reduction of $NO_2$ in said exhaust gas.

* * * * *